(12) United States Patent
Duan

(10) Patent No.: US 10,667,005 B2
(45) Date of Patent: May 26, 2020

(54) PLAYING METHOD AND PLAYING SYSTEM

(71) Applicant: BOE TECHNOLOGY GROUP CO., LTD., Beijing (CN)

(72) Inventor: Ran Duan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/933,764

(22) Filed: Mar. 23, 2018

(65) Prior Publication Data

US 2019/0069020 A1 Feb. 28, 2019

(30) Foreign Application Priority Data

Aug. 22, 2017 (CN) .......................... 2017 1 0725469

(51) Int. Cl.
H04N 21/436 (2011.01)
G06K 9/00 (2006.01)
(Continued)

(52) U.S. Cl.
CPC ....... H04N 21/436 (2013.01); G06K 9/00228 (2013.01); H04N 21/4104 (2013.01); H04N 21/4126 (2013.01); H04N 21/4302 (2013.01); H04N 21/4307 (2013.01); H04N 21/4363 (2013.01)

(58) Field of Classification Search
CPC ............. H04N 21/436; H04N 21/4302; H04N 21/4104; H04N 21/4307; H04N 21/4126; H04N 21/4363; G06K 9/00228
See application file for complete search history.

(56) References Cited

U.S. PATENT DOCUMENTS

2009/0051823 A1* 2/2009 Tsurumoto ............. G08C 17/00
348/734
2011/0069940 A1* 3/2011 Shimy .................. G11B 27/105
386/296
2018/0338177 A1* 11/2018 Graham ............. H04N 21/4126

FOREIGN PATENT DOCUMENTS

CN 102833365 A 12/2012
CN 104270668 A 1/2015
(Continued)

OTHER PUBLICATIONS

First Office Action dated Sep. 16, 2019 corresponding to Chinese application No. 201710725469.5.
(Continued)

Primary Examiner — Kunal Langhnoja
(74) Attorney, Agent, or Firm — Nath, Goldberg & Meyer; Joshua B. Goldberg; Daniel Bissing

(57) ABSTRACT

The present application provides a playing method and a playing system. The playing method includes: playing display contents by a first display device; upon receipt of a storage instruction, recording playing position information and sending matching information to a second display device by the first display device; searching, by the second display device, for the first display device that sends the matching information upon receipt of a resuming instruction; pairing the first display device with the second display device; transmitting, by the first display device, the playing position information to the second display device; and resuming, by the second display device, playing the display contents according to the playing position information.

15 Claims, 4 Drawing Sheets

(51) Int. Cl.
*H04N 21/43* (2011.01)
*H04N 21/41* (2011.01)
*H04N 21/4363* (2011.01)

(56) References Cited

FOREIGN PATENT DOCUMENTS

| | | |
|---|---|---|
| CN | 105282610 A | 1/2016 |
| CN | 106303670 A | 1/2017 |
| CN | 106534975 A | 3/2017 |

OTHER PUBLICATIONS

Second Office dated Mar. 9, 2020 corresponding to Chinese application No. 201710725469.5.

\* cited by examiner

PLAYING METHOD AND PLAYING SYSTEM

CROSS-REFERENCE TO RELATED APPLICATION

This application claims priority to Chinese Patent Application No. 201710725469.5, filed on Aug. 22, 2017, the contents of which are incorporated herein by reference in the entirety.

TECHNICAL FIELD

The present disclosure relates to the field of display technology, and particularly relates to a playing method and a playing system.

BACKGROUND

Today, every family has more than one display device, such as a TV, a tablet computer, and the like. These display devices may be respectively placed in different rooms, for example, a living room, a bedroom, and even a kitchen.

SUMMARY

The present disclosure provides a playing method and a playing system.

The playing method provided in the present disclosure includes:

playing display contents by a first display device:

upon receipt of a storage instruction, recording playing position information and sending matching information to a second display device by the first display device;

searching, by the second display device, for the first display device that sends the matching information upon receipt of a resuming instruction;

pairing the first display device with the second display device;

transmitting the playing position information by the first display device to the second display device; and resuming playing the display contents by the second display device according to the playing position information.

Optionally, the storage instruction is sent by a viewer to the first display device; and the resuming instruction is sent by the viewer to the second display device.

Optionally, the storage instruction and the resuming instruction are input by the viewer through an input device.

Optionally, the first display device acquires identity information of the viewer and continuously monitors activities of the viewer; and once the viewer leaves a monitoring range of the first display device, it is considered that the first display device receives the storage instruction; and once the second display device detects that the viewer who leaves the monitoring range of the first display device enters a monitoring range of the second display device, it is considered that the second display device receives the resuming instruction.

Optionally, the first display device acquires the identity information of the viewer and monitors the activities of the viewer by face recognition;

upon receipt of the storage instruction, the first display device notifies other display devices including the second display device to start face recognition scanning.

Optionally, the second display device stores priorities respectively corresponding to pieces of identity information of a plurality of viewers;

when detecting that there are at least two viewers in the monitoring range of the second display device after a viewer enters the monitoring range of the second display device, the second display device resumes playing the display contents corresponding to the viewer having the highest priority.

Optionally, when the number of viewers in the monitoring range of the second display device reaches a preset threshold, the second display device continues playing current display contents regardless of whether a new viewer enters the monitoring range of the second display device.

Optionally, when detecting that the viewer leaving the monitoring range of the first display device enters the monitoring range of the second display device, the second display device detects a duration in which the viewer gazes at the second display device; if the detected duration exceeds a preset threshold, it is considered that the second display device receives the resuming instruction; and the second display device detects a duration in which the viewer does not gaze at the second display device while playing the display contents; if the duration in which the viewer does not gaze at the second display device exceeds a preset threshold, the second display device stops playing and is turned off.

Optionally, if it is detected that a duration in which no one watches the first display device exceeds a preset threshold, a display screen of the first display device is turned off.

Optionally, the identity information of the viewer and information indicating whether a resume function is enabled for the viewer is preset in association with each other in the first display device;

when acquiring the identity information of the viewer and detecting that the viewer leaves the monitoring range of the first display device, the first display device checks whether the resume function is enabled for the viewer according to the identity information of the viewer; if the resume function is not enabled for the viewer, it is considered that the first display device does not receive the storage instruction; and if the resume function is enabled for the viewer, it is considered that the first display device receives the storage instruction.

Optionally, the identity information of the viewer and specific display contents of the viewer are preset in association with each other in the first display device;

when detecting the identity information of the viewer, the first display device automatically plays the specific display contents corresponding to the viewer.

Optionally, the matching information includes a wireless display standard and current playing position information.

Optionally, the first display device and the second display device are in one local area network, and support a same wireless display standard.

Optionally, the step of searching, by the second display device, for the first display device that sends the matching information upon receipt of the resuming instruction includes:

scanning, by the second display device, all display devices in the local area network until the first display device that sends the matching information is found.

Optionally, the step of sending the matching information to the second display device by the first display device includes:

broadcasting, by the first display device, the matching information in the local area network to send the matching information to all of the display devices in the local area network.

A playing system provided in the present disclosure includes a first display device and a second display device;

the first display device is configured to:
  play display contents;
  upon receipt of a storage instruction of a viewer, record playing position information and send matching information to other display devices including the second display device; and
  transmit the playing position information to the second display device after being paired with the second display device; and
the second display device is configured to:
  search for the first display device that sends the matching information upon receipt of a resuming instruction, and be paired with the first display device; and
  resume playing the display contents according to the playing position information.

Optionally, the playing system further includes an input device configured for the viewer to send the storage instruction to the first display device and send the resuming instruction to the second display device.

Optionally, the playing system further includes a first monitoring device corresponding to the first display device and a second monitoring device corresponding to the second display device, and both the first monitoring device and the second monitoring device are configured to detect identity information of the viewer and monitor activities of the viewer, and the first monitoring device is further configured to send the storage instruction to the first display device when detecting that the viewer leaves the monitoring range of the first monitoring device; and the second monitoring device is further configured to send the resuming instruction to the second display device when detecting that the viewer leaving the monitoring range of the first display device enters the monitoring range of the second monitoring device.

Optionally, the first display device and the second display device are in one local area network, and support a same wireless display standard.

Optionally, the first display device is further configured to notify other display devices including the second display device in the local area network to start face recognition scanning upon receipt of the storage instruction.

DETAILED DESCRIPTION OF THE EMBODIMENTS

Sometimes, when watching contents played by a display device in one room, a viewer may have to leave the room and thus miss the contents they want to watch. When the viewer walks into another room, it is desirable that a display device in this room can resume playing the contents played by the display device in the previous room, so that the viewer can continue watching the contents of interest. Although most current display devices cm be connected to the Internet, they are generally not interconnected, so a viewer cannot watch continuous video contents using different display devices.

The present disclosure provides a playing method and a playing system, which can allow a viewer to watch continuous video contents using different display devices.

To make those skilled in the art better understand the technical solutions of the present disclosure, the playing method and the playing system provided in the present disclosure are described in detail below with reference to the accompanying drawings.

Figure 1:
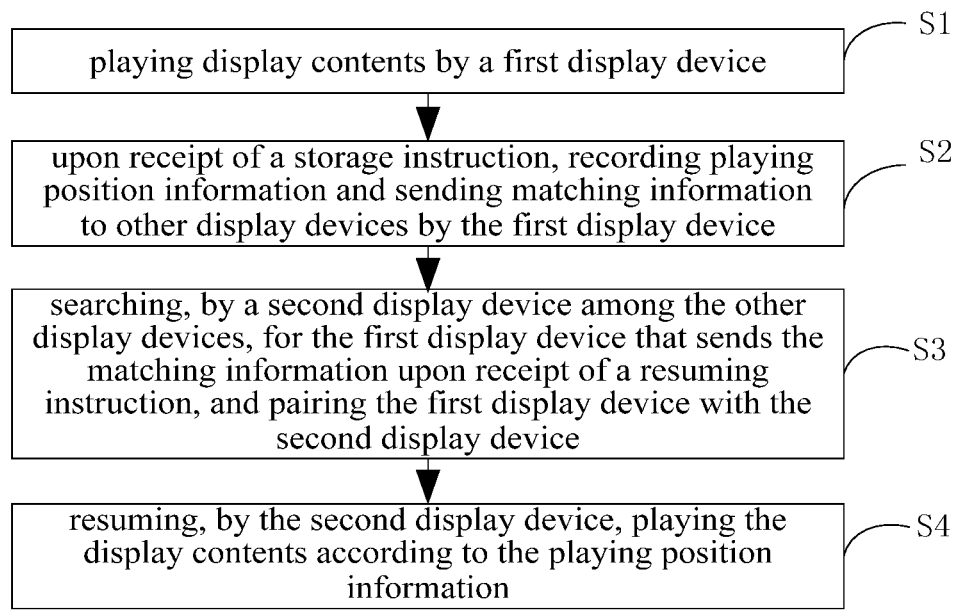
FIG. 1 is a flowchart of a playing method provided in an embodiment of the present disclosure.

Referring to FIG. 1, a playing method provided in an embodiment of the present disclosure includes steps of:

S1: playing display contents by a first display device;

S2: upon receipt of a storage instruction, recording playing position information and sending matching information to other display devices by the first display device;

S3: searching, by a second display device among the other display devices, for the first display device that sends the matching information upon receipt of a resuming instruction, and pairing the first display device with the second display device;

S4: resuming, by the second display device, playing the display contents according to the playing position information.

In step S2, the storage instruction may be used to enable a resume function of the first display device, and upon receipt of the storage instruction, the first display device may pause playing the current display contents to save electricity or may continue playing as long as the current playing position is recorded. Meanwhile, the first display device sends the matching information including the playing position information to other display devices. Optionally, the matching information may include a wireless display standard and the playing position information. The playing position information includes information indicating the playing position at the time when the first display device receives the storage instruction.

The so-called wireless display standard refers to a standard for transmitting video information among display devices. The resume function refers to a function that when a viewer switches from one display device that is playing display contents to another display device, the another display device continues with the playing of the display contents In step S3, the resuming instruction may be used to enable the resume function of the second display device. Upon receipt of the resuming instruction, the second display device searches for the first display device that sends the matching information. The searching process refers to a process of searching for the display device which sends the matching information among all of the display devices. At the same time, the second display device is paired with the first display device, that is, the two display devices are paired by using a wireless display standard. After the pairing succeeds, the second display device resumes playing the display contents according to the playing position information from the first display device. Specifically, the second display device may start to play the display contents from the playing position indicated by the playing position information.

The specific process of pairing two display devices by using the wireless display standard is as follows: first, the two display devices are connected to one network; and when searching for the first display device that sends the matching information, the second display device may select the display device that sends the matching information from a list of all of the display devices and communicate with the selected display device. After the pairing is completed, the first display device transmits the playing position information to the second display device according to the wireless display standard.

With the playing method provided by the present disclosure, a viewer can watch continuous video contents on different display devices, so that the viewer can watch the contents of interest more continuously and attentively without being interrupted by chores.

Figure 2:
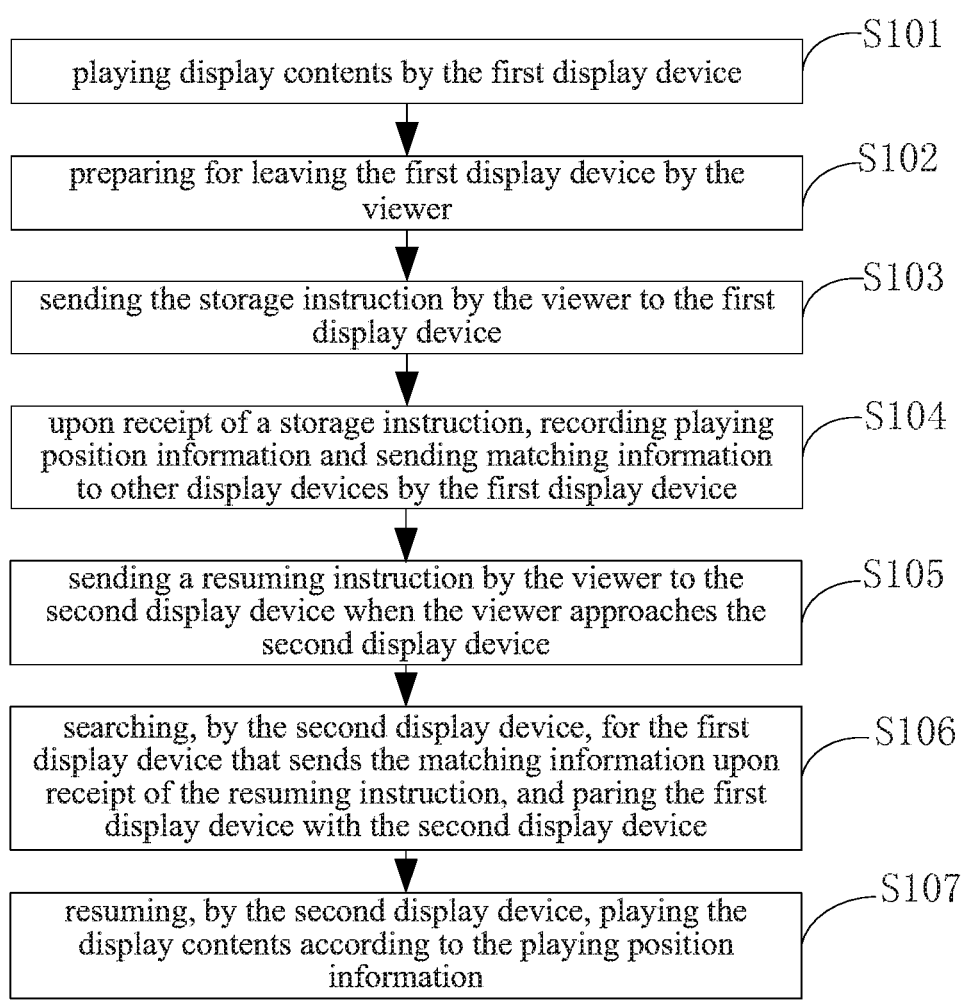
FIG. 2 is a flowchart of a playing method provided in an embodiment of the present disclosure.

Referring to FIG. 2, a playing method provided by another embodiment of the present disclosure includes steps S101 to S107.

In step S101: the first display device plays display contents.

In step S102: the viewer prepares for leaving the first display device.

In step S103: the viewer sends a storage instruction to the first display device.

In step S104: upon receipt of the storage instruction, the first display device records playing position information and sends matching information to other display devices including the second display device.

In step S105: the viewer sends a resuming instruction to the second display device when the viewer approaches the second display device.

In step S106: the second display device searches for the first display device that sends the matching information upon receipt of the resuming instruction, and the first display device is paired with the second display device.

In step S107: the second display device resumes playing the display contents according to the playing position information.

In the embodiment, both the storage instruction and the resuming instruction are sent by the viewer manually. The resume functions of the first display device and the second display device are enabled or disabled according to an operation of the viewer, and the operation is simple. Specifically, every display device is equipped with an input device such as a remote controller or a touch screen, and the storage instruction and the resuming instruction is input by the viewer through the remote controller or the touch screen. For example, buttons for inputting the storage instruction and the resuming instruction are provided on the remote controller; and the touch screen has software for inputting the storage instruction and the resuming instruction. Needless to say, in practical applications, the viewer can also input the storage instruction and the resuming instruction in other ways, such as voice input, etc.

Figure 3:
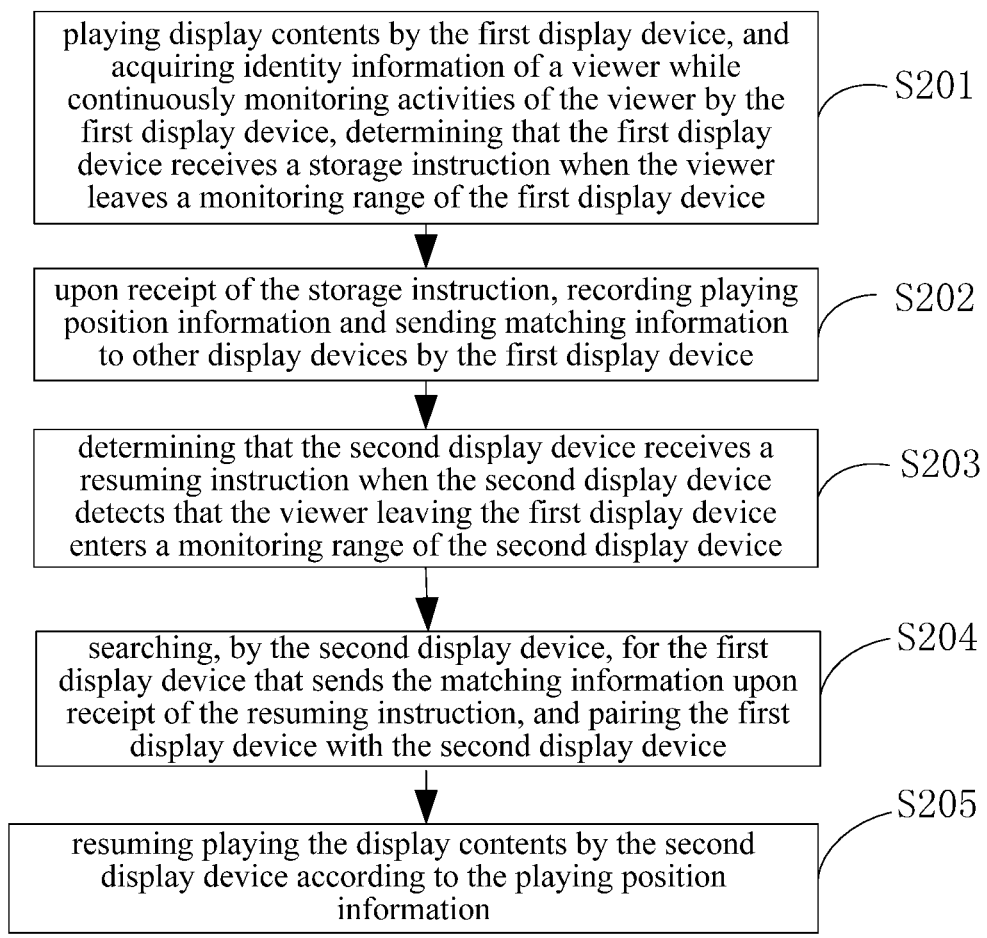
FIG. 3 is a flowchart of a playing method provided in an embodiment of the present disclosure.

Referring to FIG. 3, a playing method provided by another embodiment of the present disclosure includes steps S201 to S205.

In step S201: the first display device plays display contents, and acquires identity information of a viewer while continuously monitoring activities of the viewer, wherein when the viewer leaves a monitoring range of the first display device, it is considered that the first display device receives a storage instruction.

In step S202: upon receipt of the storage instruction, the first display device records playing position information and sends matching information to other display devices including the second display device.

In step S203: it is considered that the second display device receives a resuming instruction when the second display device detects that the viewer leaving the first display device enters a monitoring range of the second display device.

In step S204: the second display device searches for the first display device that sends the matching information upon receipt of the resuming instruction, and the first display device is paired with the second display device.

In step S205: the second display device resumes playing the display contents according to the playing position information.

In the embodiment, the first display device continuously monitors the activities of the viewer, and automatically sends the matching information to other display devices when detecting that the viewer leaves the monitoring range of the first display device. The second display device automatically searches for the first display device that sends the matching information when detecting that the viewer who leaves the first display device enters the monitoring range of the second display device.

The monitoring range as used herein refers to a range in which a monitoring device provided on a display device and used for detecting identity information and activities of a viewer can monitor the activities of the viewer. Once the viewer enters the range, the monitoring device can recognize the identity of the viewer and monitor the activities of the viewer. For example, the monitoring device is a camera, and the monitoring range of the camera may be represented by a distance between the viewer and the display device. The distance is usually in the range of about 10 m to about 20 m.

The identity information of the viewer is not limited in the present disclosure, as long as it can distinguish different viewers. For example, the identity information of the viewer may be face recognition information, clothing information, or the like, of the viewer.

Figure 4:
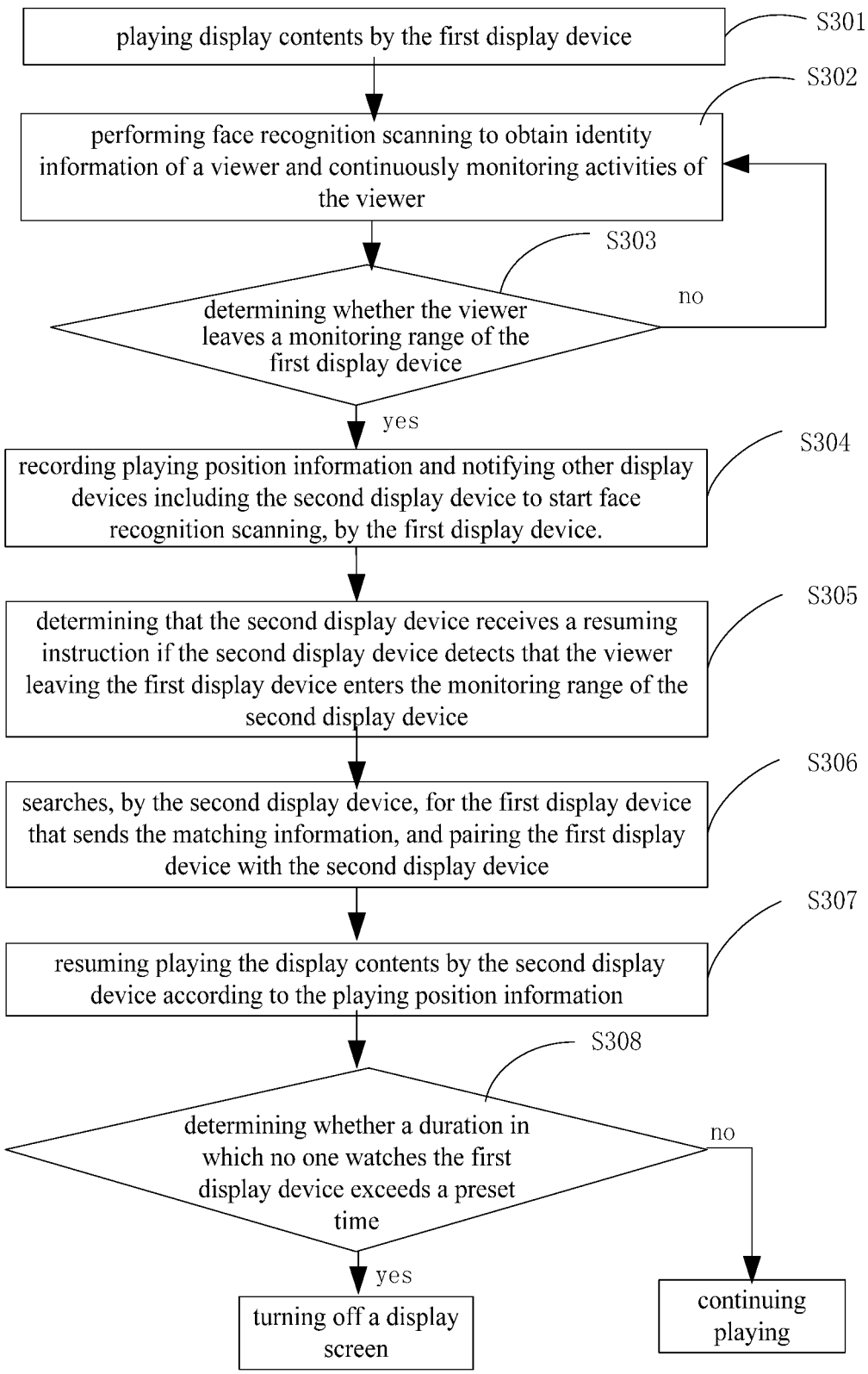
FIG. 4 is a flowchart of a playing method provided in an embodiment of the present disclosure.

Referring to FIG. 4, a playing method provided by another embodiment of the present disclosure is a specific embodiment of the playing method provided in the foregoing embodiments. Specifically, the playing method includes steps S301 to S308.

In step S301: the first display device plays display contents.

In step S302: the first display device performs face recognition scanning to obtain identity information of a viewer and continuously monitors activities of the viewer.

In step S303: the first display device determines whether the viewer leaves a monitoring range thereof, if the determination is negative, the method proceeds to step S302; if the determination is confirmative, it is considered that the first display device receives the storage instruction, and the method proceeds to S304.

In step S304: the first display device records playing position information and notifies other display devices including the second display device to start face recognition scanning.

In step S305: it is considered that the second display device receives a resuming instruction if the second display device detects that the viewer leaving the first display device enters the monitoring range of the second display device.

In step S306: the second display device searches for the first display device that sends the matching information, and the first display device is paired with the second display device.

In step S307: the second display device resumes playing the display contents according to the playing position information.

In step S308: the first display device determines whether a duration in which no one watches the first display device exceeds a preset time, if the determination is confirmative, a display screen of the first display device is turned off, if the determination is negative, the first display device continues playing.

Optionally, the other display devices may always perform face recognition scanning without being notified by the first display device. The face recognition scanning is performed to acquire the identity information of the viewer and monitor the activities of the viewer, the viewer does not need to specifically cooperate with a face acquisition device, and the face image can be obtained unconsciously. Further, the face recognition can classify, determine and recognize a plurality of faces at the same time.

Optionally, the identity information of the viewer and information indicating whether or not the resume function is enabled for the viewer are preset in the first display device. Once the first display device acquires the identity information of the viewer and detects that the viewer leaves the monitoring range of the first display device, the first display device checks whether the resume function is enabled for the viewer, if the resume function is not enabled for the viewer, it is considered that the first display device does not receive the storage instruction, if the resume function is enabled for the viewer, it is considered that the first display device receives the storage instruction. In this way, the playing method can be implemented only for a specific user for whom the resume function is enabled. For example, face recognition information of a viewer and information indicating whether or not the resume function is enabled for the viewer are set in advance in the first display device. When detecting the face recognition information of the viewer by face recognition, the first display device checks, according to the face recognition information, whether the resume function corresponding to the viewer is enabled or disabled, if the resume function is enabled, it is considered that the first display device receives the storage instruction when the viewer is detected. to leave the monitoring range of the first display device; if the resume function is disabled, it is considered that the first display device does not receive the storage instruction when the viewer is detected to leave the monitoring range of the first display device.

In the case of a plurality of viewers, a specific embodiment of the playing method is as follows.

In a first playing method, the second display device stores priorities of a plurality of viewers in association with the identity information of the plurality of viewers. If the second display device detects that there are at least two viewers in the monitoring range of the second display device after a viewer enters the monitoring range of the second display device, the second display device resumes playing the display contents corresponding to the viewer having the highest priority.

For example, the viewer A and the viewer B initially watch the display contents played by two different first display devices (A' and B'), respectively; then, the viewer B comes to the first display device A' that the viewer A is watching, and at this point, for the viewer B, the first display device A' that viewer A is watching corresponds to the second display device for the viewer B. If the priority of the viewer B is higher than that of the viewer A, the first display device A' that the viewer A is watching continues to play the display contents watched by the viewer B on the first display device B', If the priority of the viewer B is lower than that of the viewer A, the playing contents of the first display device A' that the viewer A is watching will not be changed. If the priorities of the viewer A and the viewer B are the same, the display contents watched by one of the two viewers on the corresponding first display device are randomly selected to resume.

Based on the playing method, when the number of viewers in the monitoring range of the second display device reaches a preset value, the second display device continues playing the current display contents regardless of whether a new viewer enters its monitoring range.

In a second playing method, in a case where a plurality of viewers enter the monitoring range of one second display device from different first display devices, if the plurality of viewers enter the monitoring range of the second display device successively, the second display device resumes playing the display contents that the viewer who enters first watches on the corresponding first display device; if the plurality of viewers enter the monitoring range of the second display device simultaneously, the display contents watched by one of the plurality of viewers on the corresponding first display device are selected at random to resume; alternatively, according to the priorities of the viewers, the display contents that the viewer having the highest priority watches on the corresponding first display device are selected to resume.

Optionally, when detecting that a viewer enters the monitoring range of the second display device, the second display device detects a duration in which the viewer gazes at the second display device; if the duration in which the viewer gazes at the second display device exceeds a preset threshold (e.g., 10 s), it is considered that the second display device receives the resuming instruction, otherwise, it is considered that the second display device does not receive the resuming instruction. Optionally, the second display device detects the duration in which the viewer does not gaze at the second display device while playing the display contents continuously; and if the duration in which the viewer does not gaze at the second display device exceeds a preset threshold (e.g., 5 min), the second display device stops playing and is turned off. For example, an eye tracker or other device may be provided to monitor whether the viewer's gaze point is on the second display device. In this way, a case where a person entering the monitoring range of the second display device does not need to watch the second display device can be excluded, and playing of the display contents can be stopped when the viewer no longer watches the second display device.

Optionally, the identity information of the viewer and information indicating whether or not the resume function is enabled for the viewer are preset in the first display device. Once the first display device acquires the identity information of the viewer and detects that the viewer leaves the monitoring range of the first display device, the first display device checks whether the resume function is enabled for the viewer, if the resume function is not enabled for the viewer, it is considered that the first display device does not receive the storage instruction, if the resume function is enabled for the viewer, it is considered that the first display device receives the storage instruction. In this way, the playing method can be implemented only for a specific user for whom the resume function is enabled. For example, face recognition information of a viewer and information indicating whether or not the resume function is enabled for the viewer are set in advance in the first display device. When detecting the face recognition information of the viewer by face recognition, the first display device checks, according to the face recognition information, whether the resume function corresponding to the viewer is enabled or disabled, if the resume function is enabled, it is considered that the first display device receives the storage instruction when the viewer is detected to leave the monitoring range of the first display device; if the resume function is disabled, it is considered that the first display device does not receive the storage instruction when the viewer is detected to leave the monitoring range of the first display device.

Optionally, the identity information of a viewer and specific display contents corresponding to the viewer may be preset in the first display device. Once the first display device detects the identity information of the viewer, the first display device automatically plays the specific display contents corresponding to the viewer. In this way, specific display contents, such as a ball game in a specific time period, a science fiction movie, financial news, and the like, can be resumed for the user.

Figure 5:
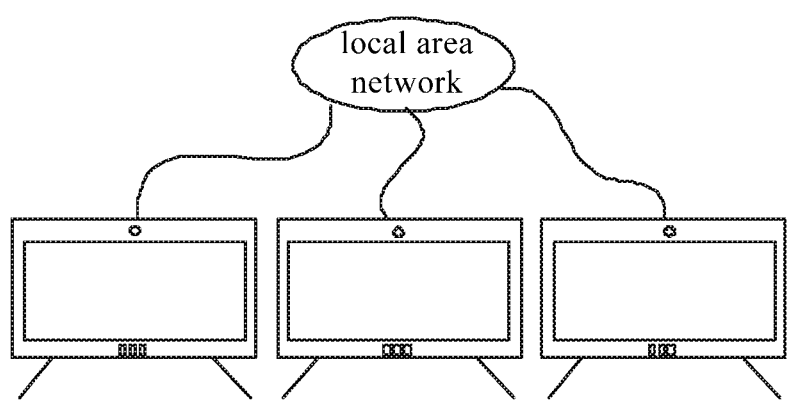
FIG. 5 is a schematic diagram illustrating connection among display devices adopted in embodiments of the present disclosure.

In the embodiments, as shown in FIG. 5, all the display devices are in one local area network and support a same wireless display standard. The wireless display standard is, for example, Miracast, DLNA (Digital Living Network Alliance), or the like. In this case, the step of sending the matching information to the other display devices by the first display device may include: broadcasting, by the first display device, the matching information in the local area network so as to send the matching information to all of the display devices in the local area network. The step of searching, by the second display device among the other display devices, for the first display device that sends the matching information upon receipt of the resuming instruction, and pairing the first display device with the second display device may include:

scanning, by the second display device, all of the display devices in the local area network until the first display device that sends the matching information is found; and pairing the first display device with the second display device.

In summary, the playing method provided in the embodiments of the present disclosure enables the viewer to watch continuous video contents using different display devices, so that the viewer can continuously watch the contents of interest.

The present disclosure also provides a playing system including at least two display devices, and the at least two display devices include a first display device and a second display device. The first display device is configured to: play display contents; upon receipt of a storage instruction, record playing position information and send matching information to other display devices including the second display device; and transmit the playing position information to the second display device after being paired with the second display device. The second display device is configured to: search for the first display device that sends the matching information upon receipt of a resuming instruction, and be paired with the first display device; and resume playing the display contents according to the playing position information received from the first display device.

The storage instruction and the resuming instruction may both be sent by the viewer manually. In some embodiments, the playing system further includes an input device configured for the viewer to send the storage instruction to the first display device and send the resuming instruction to the second display device. Optionally, the input device includes a remote controller or a touch screen.

In some embodiments, the first display device continuously monitors the activities of the viewer, and automatically sends the matching information to the other display devices when detecting that the viewer leaves the monitoring range of the first display device. The second display device automatically searches for the first display device that sends the matching information when detecting that the viewer who leaves the first display device enters the monitoring range of the second display device. Optionally, the playing system further includes a first monitoring device corresponding to the first display device and a second monitoring device corresponding to the second display device, and both the first monitoring device and the second monitoring device are configured to detect identity information of the viewer and continuously monitor activities of the viewer. The first monitoring device and the second monitoring device are, for example, face recognition devices. Optionally, the first monitoring device and the second monitoring device are cameras.

The first monitoring device corresponding to the first display device is further configured to send the storage instruction to the first display device when detecting that the viewer leaves the monitoring range of the first monitoring device. The second monitoring device corresponding to the second display device is further configured to send the resuming instruction to the second display device when detecting that the viewer leaving the first display device enters the monitoring range of the second monitoring device. In this case, the monitoring range of the first monitoring device corresponds to the monitoring range of the first display device, and the monitoring range of the second monitoring device corresponds to the monitoring range of the second display device. The first monitoring device and the second monitoring device may be provided respectively in the first display device and the second display device, or separately from the first display device and the second display device.

The first display device and the second display device are in one local area network, and support a same wireless display standard.

Optionally, the first display device notifies the other display devices in the local area network to start face recognition scanning upon receipt of the storage instruction; alternatively, the other display devices in the local area network may always perform face recognition scanning without being notified by the first display device.

The playing system provided in the present disclosure enables the viewer to watch continuous video contents using different display devices, so that the viewer can continuously watch the contents of interest.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

The invention claimed is:

1. A playing method, comprising:
    playing display contents by a first display device;
    upon receipt of a storage instruction, recording playing position information, wherein the first display device and a second display device are in one local area network and support a same wireless display standard;
    broadcasting, by the first display device, matching information in the local area network, wherein the matching information comprises the wireless display standard;
    scanning, by the second display device, all of the display devices in the local area network until the first display device that sends the matching information is found, upon receipt of a resuming instruction;

pairing the first display device with the second display device;

transmitting, by the first display device, the playing position information to the second display device according to the wireless display standard; and resuming, by the second display device, playing the display contents according to the playing position information, wherein the wireless display standard comprises one of Miracast and Digital Living Network Alliance (DLNA), when detecting that a viewer leaving a monitoring range of the first display device enters a monitoring range of the second display device, the second display device detects a duration in which the viewer gazes at the second display device; if the detected duration exceeds a preset threshold, it is considered that the second display device receives the resuming instruction, and when a number of viewers in the monitoring range of the second display device reaches a preset threshold, the second display device continues playing current display contents regardless of whether a new viewer enters the monitoring range of the second display device.

2. The playing method of claim 1, wherein the storage instruction is sent by a viewer to the first display device; and the resuming instruction is sent by the viewer to the second display device.

3. The playing method of claim 2, wherein the storage instruction and the resuming instruction are input by the viewer through an input device.

4. The playing method of claim 1, wherein the first display device acquires identity information of the viewer and continuously monitors activities of the viewer; once the viewer leaves the monitoring range of the first display device, it is considered that the first display device receives the storage instruction; and once the second display device detects that the viewer who leaves the monitoring range of the first display device enters the monitoring range of the second display device, it is considered that the second display device receives the resuming instruction.

5. The playing method of claim 4, wherein the first display device acquires the identity information of the viewer and monitors the activities of the viewer by face recognition; and upon receipt of the storage instruction, the first display device notifies other display devices including the second display device to start face recognition scanning.

6. The playing method of claim 4, wherein the second display device stores priorities respectively corresponding to identity information of a plurality of viewers; and when detecting that there are at least two viewers in the monitoring range of the second display device after the viewer enters the monitoring range of the second display device, the second display device resumes playing the display contents corresponding to a viewer having the highest priority.

7. The playing method of claim 4, wherein the second display device detects a duration in which the viewer does not gaze at the second display device while playing the display contents; if the duration in which the viewer does not gaze at the second display device exceeds a preset threshold, the second display device stops playing and is turned off.

8. The playing method of claim 4, wherein the identity information of the viewer and information indicating whether a resume function is enabled for the viewer are preset in association with each other in the first display device; and when acquiring the identity information of the viewer and detecting that the viewer leaves the monitoring range of the first display device, the first display device checks whether the resume function is enabled for the viewer according to the identity information of the viewer; if the resume function is not enabled for the viewer, it is considered that the first display device does not receive the storage instruction; and if the resume function is enabled for the viewer, it is considered that the first display device receives the storage instruction.

9. The playing method of claim 4, wherein the identity information of the viewer and specific display contents of the viewer are preset in association with each other in the first display device; and when acquiring the identity information of the viewer, the first display device automatically plays the specific display contents corresponding to the viewer.

10. The playing method of claim 1, wherein when it is detected that a duration in which no one watches the first display device exceeds a preset threshold, a display screen of the first display device is turned off.

11. The playing method of claim 1, wherein the matching information comprises the playing position information.

12. A playing system, comprising a first display device and a second display device which are in one local area network and support a same wireless display standard; wherein the first display device is configured to:
play display contents;
upon receipt of a storage instruction of a viewer, record playing position information and broadcast matching information in the local area network, wherein the matching information comprises the wireless display standard; and
transmit the playing position information to a second display device based on the wireless display standard after being paired with the second display device;

the second display device is configured to:
scan all of the display devices in the local area network until the first display device that sends the matching information is found, upon receipt of a resuming instruction, and be paired with the first display device; and
resume playing the display contents according to the playing position information received from the first display device, wherein the wireless display standard comprises one of Miracast and Digital Living Network Alliance (DLNA), when detecting that a viewer leaving a monitoring range of the first display device enters a monitoring range of the second display device, the second display device is configured to detect a duration in which the viewer gazes at the second display device, if the detected duration exceeds a preset threshold, it is considered that the second display device receives the resuming instruction, and when a number of viewers in the monitoring range of the second display device reaches a preset threshold, the second display device is configured to continue playing current display contents regardless of whether a new viewer enters the monitoring range of the second display device.

13. The playing system of claim 12, further comprising an input device configured for the viewer to send the storage instruction to the first display device and send the resuming instruction to the second display device.

14. The playing system of claim 12, further comprising a first monitoring device corresponding to the first display device and a second monitoring device corresponding to the second display device, and both the first monitoring device and the second monitoring device are configured to detect identity information of the viewer and monitor activities of the viewer, the first monitoring device is further configured to send the storage instruction to the first display device when detecting that the viewer leaves the monitoring range of the first monitoring device; and the second monitoring device is further configured to send the resuming instruction to the second display device when detecting that the viewer leaving the monitoring range of the first display device enters the monitoring range of the second monitoring device.

15. The playing system of claim 12, wherein the first display device is further configured to notify other display devices including the second display device in the local area network to start face recognition scanning upon receipt of the storage instruction.

* * * * *